United States Patent
Chen

(10) Patent No.: US 6,504,317 B1
(45) Date of Patent: Jan. 7, 2003

(54) CEILING LAMP BRIGHTNESS CONTROL DEVICE

(76) Inventor: Shih Hsun Chen, No. 368, Sec. 4 Shatien Rd., Lung-Ching Hsiang, Taichung Hsien (TW)

(*) Notice: Subject to any disclaimer, the term of this patent is extended or adjusted under 35 U.S.C. 154(b) by 0 days.

(21) Appl. No.: 09/928,687

(22) Filed: Aug. 14, 2001

(51) Int. Cl.⁷ .............................. H05B 37/02
(52) U.S. Cl. ..................... 315/224; 315/291
(58) Field of Search .......... 315/56, 291, 224, 315/226

(56) References Cited

U.S. PATENT DOCUMENTS 5,254,907 A * 10/1993 Matsuno et al. ............ 307/10.8
6,084,358 A * 7/2000 Dolson ....................... 315/226
6,166,497 A * 12/2000 Kim ............................ 315/291

* cited by examiner

*Primary Examiner*—Tan Ho
(74) *Attorney, Agent, or Firm*—Rosenberg, Klein & Lee

(57) ABSTRACT

A ceiling lamp brightness control device includes a zipper switch, a power element and a control circuit. By the positioning of the zipper switch, a specific time clock waveform is generated by triggering a diode so that the power element is conducted in a specific time of an AC waveform. Thereby, the brightness of the ceiling lamp can be adjusted step by step.

4 Claims, 3 Drawing Sheets

CEILING LAMP BRIGHTNESS CONTROL DEVICE

FIELD OF THE INVENTION

The present invention relates to a ceiling lamp brightness control device, wherein the brightness of a ceiling lamp can be adjusted step by step.

BACKGROUND OF THE INVENTION

Conventionally, the ceiling lamp is controlled by a zipper switch so as to can be controlled a step by step (three or four steps). The joints are controlled by the zipper switch so as to change the lamps to a conductive condition. For example, for a ceiling lamp having five lamps, the first step causes all lamp to light up, a second stage causes three lamps to light up, the third stage causes only one lamp to light up, and in fourth stage has no lamp to light up.

However, the prior art control is not flexible. It is often that the desired light can not be adjusted by the user so as to present a soft light.

Therefore, a stepless ceiling lamp brightness control device is developed, which is formed by a central control unit, a regulator, a pulling switch, a protecting unit, a zero voltage detecting loop and gate control unit. When the pulling switch is pulled, the central control unit adjusts the conductive angle of the gate control unit based on the time period that the pull switch is pulled. As a desired brightness is presented, the user releases his hand.

However, aforesaid prior art has the following disadvantage:

1. Initially, the user can not well control the pull switch, he must train several times so as to be familiar with the operation mode.
2. In adjusting, the user must view the light until a desired brightness is presented, while at this time, the user can not view the brightness of the whole room. Therefore, the brightness must be adjusted several times for achieving a desire level. The operation is inconvenient.

SUMMARY OF THE INVENTION

Accordingly, the primary object of the present invention is to provide a ceiling lamp brightness control device, wherein the brightness of the ceiling lamp is adjustable step by step. Since the operation and control ways of the ceiling lamp are identical to the prior art. By pulling the zipper switch, the conductive ring may rotate to any angle, so that the conductive ring is conducted with a resistor of different resistance. While the current is not affected by the resistor. The ceiling lamp may present different brightness. Thereby, the brightness of the ceiling lamp can be adjusted step by step.

Another object of the present invention is to provide a ceiling lamp brightness control device, wherein the operation of the ceiling lamp is very easy. The user is only necessary to pull the zipper switch. Each time the zipper switch is pulled, the ceiling lamp presents a different brightness. The operation is very simple.

To achieve above objects, the present invention provides a ceiling lamp brightness control device having a control device one end of the control device being connected to an AC current source. Another end thereof is connected to at least one ceiling lamp. The ceiling lamp brightness control device comprises the following components:

A zipper switch has a zipper drives a shaft to rotate. The conductive ring encloses the shaft. A periphery of the conductive ring being installed with a plurality of conductive pieces spaced with an equal space. The conductive ring is able to contact a selected conductive piece;

A power element serves for controlling the conduction of the AC current source so to control a power to the ceiling lamp.

A control circuit is connected to the zipper switch and the power element. The control circuit generates a specific clock waveform through the conduction by pulling the zipper switch, thereby, the power element being triggered to be conducted at a specific time.

The various objects and advantages of the present invention will be more readily understood from the following detailed description when read in conjunction with the appended drawing.

DETAILED DESCRIPTION OF THE PREFERRED EMBODIMENTS

Figure 1:
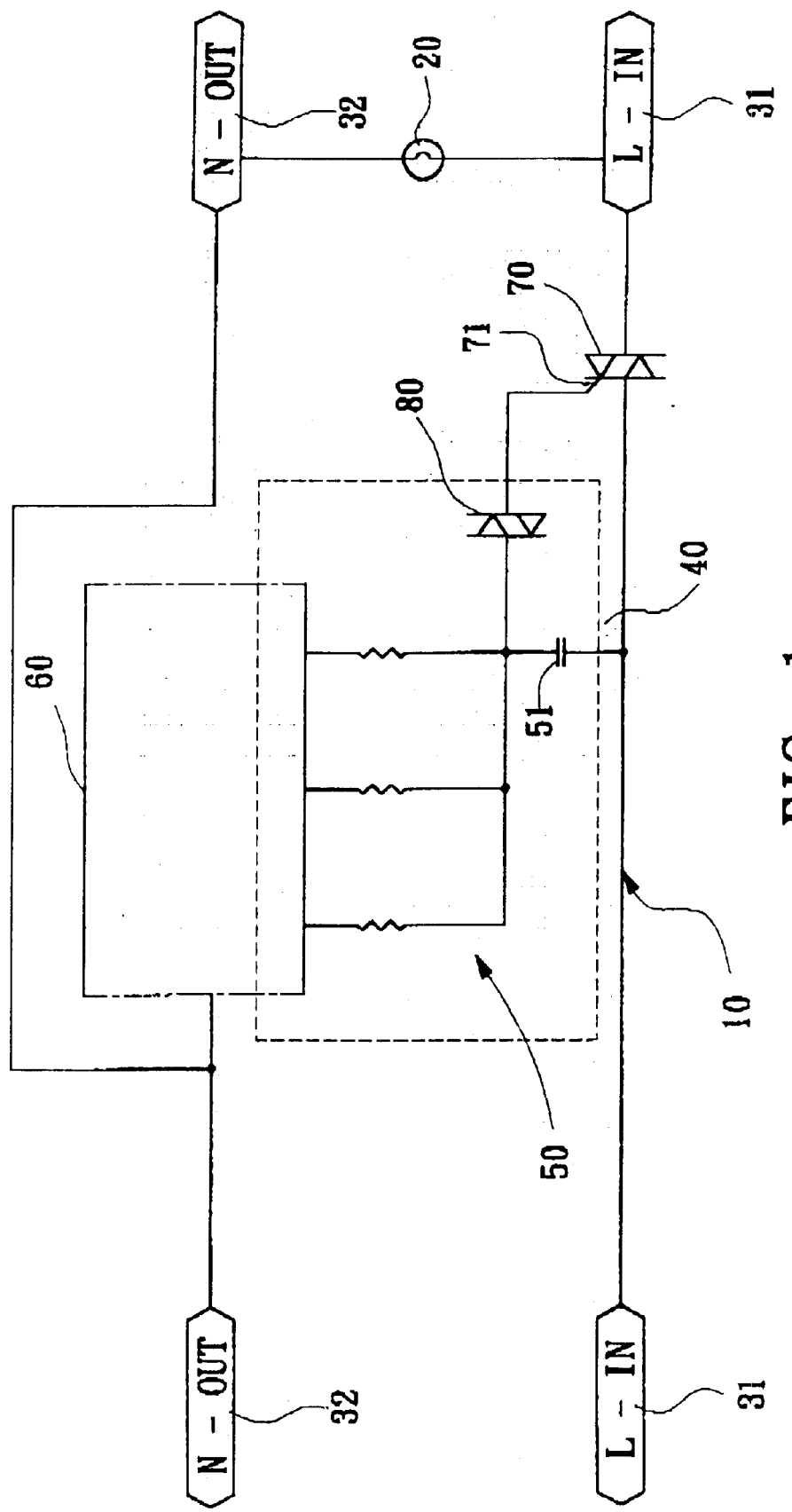
FIG. 1 is a schematic view of a preferred embodiment of the present invention.

Referring to FIG. 1 the ceiling lamp brightness control device of the present invention is illustrated. The control device 10 has an end which is connected to at least one ceiling lamp 20, and another end thereof is connected to a power wire 31 and a neutral wire 32. The control device 10 includes the follow components.

A prior zipper switch 60 has a side connected to the neutral wire 32, and another side thereof is connected to a control circuit 40. The zipper switch 60 is utilized to adjust the brightness of the ceiling lamp 20.

Figure 2:
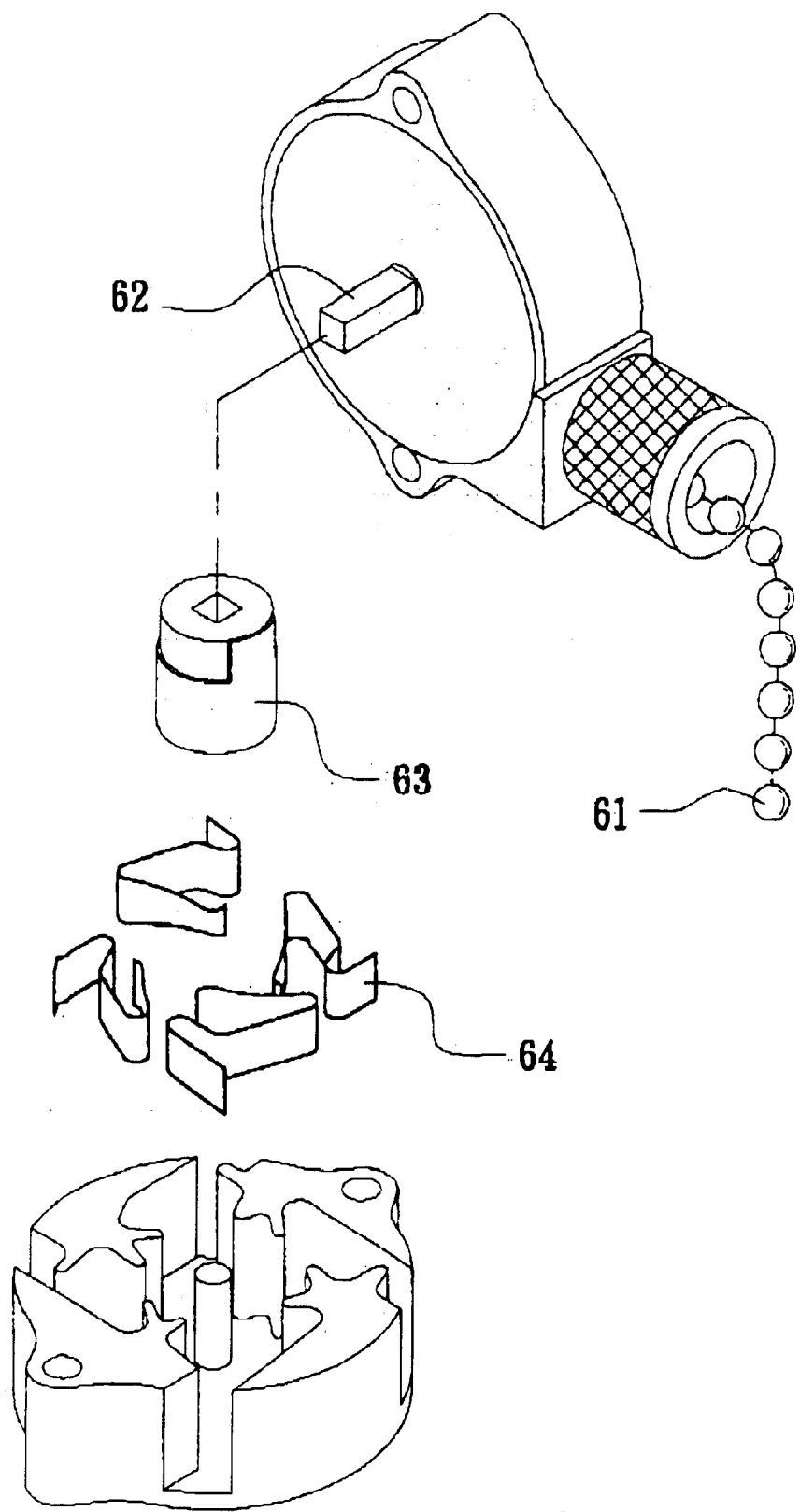
FIG. 2 is an exploded perspective view of the zipper switch in the present invention.
Figure 3A:
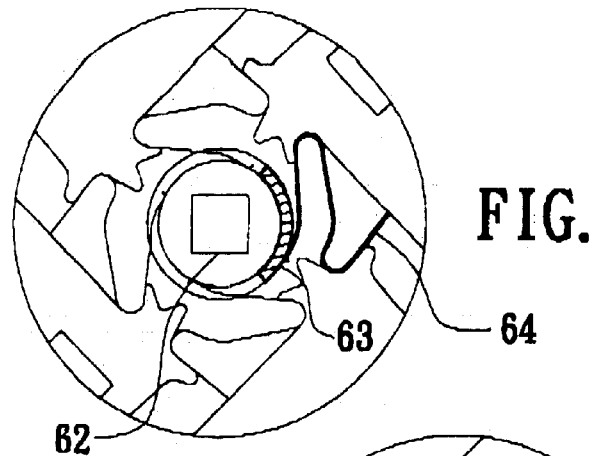
FIGS. 3A, 3B, 3C and 3D are schematic view showing the operation of the zipper switch of the present invention.
Figure 3B:
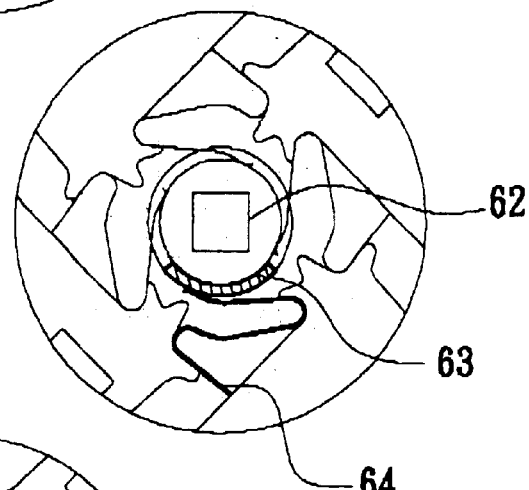
Figure 3C:
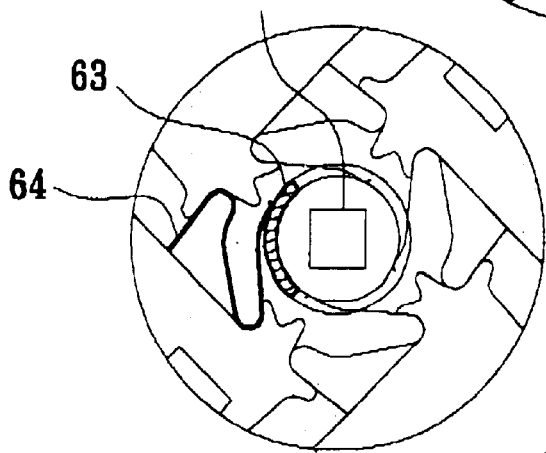
Figure 3D:
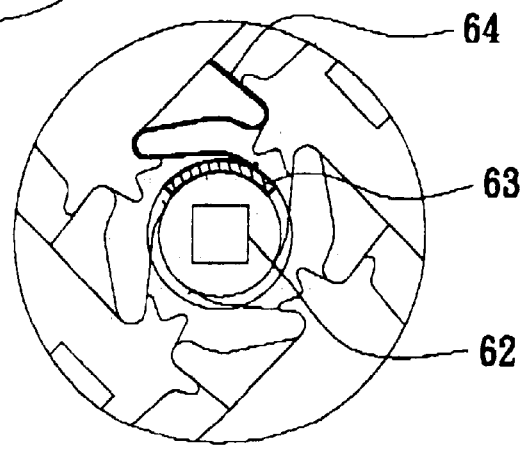

In the zipper switch 60, a zipper 61 is used to drive a shaft 62 to rotate. The conductive ring 63 encloses the shaft 62. The conductive ring 63 is installed with a plurality of conductive pieces 64 at the periphery thereof. The conductive ring 63 may contact a proper conductive piece 64, referring to FIG. 2.

A power element is a bidirectional silicon control rectifier 70 in this embodiment. One polarity thereof is connected to the power wire 31, and another polarity thereof is connected to the ceiling lamp 20. The conduction of an AC current is controlled by a gate 71 for cutting the waveform of an AC voltage so as to control the power outputted to the ceiling lamp 20.

A control circuit 40 is connected to the zipper switch 60 and the gate 71 of the bidirectional silicon control rectifier 70. The control circuit 40 includes a resistor unit 50, a capacitor 51 and a trigger diode 80. One side of the resistor unit 50 is connected to the zipper switch 60, and another side thereof is connected to the capacitor 51 and the trigger diode 80. The capacitor 51 is connected to another side of the resistor unit 50 and then is connected to the power wire 31. The trigger diode 80 is connected to another side of the resistor unit 50 and then is connected to the gate 71 of the bidirectional silicon control rectifier 70.

The resistor unit 50 may present a plurality of different resistances. The zipper switch 60 may be connected to one of the resistors of different resistances and the capacitor 51. Therefore, the time constant for charging and discharging the capacitor 51 in the circuit of the resistor unit and the capacitor may be changed. Then the signal passes through the trigger diode 80 to be filtered so as to generate a specific waveform. Specific clock waveform passes through the gate 71 of the bidirectional silicon control rectifier 70 so as to conduct the rectifier at a specific timing. Specific time clock enters into the gate 71 of the bidirectional silicon control rectifier 70 to control the gate to conduct at a specific time.

Referring to FIG. 3, when an user pull the zipper switch 60, the zipper 61 may drive the shaft 62 to rotate so as to drive the conductive ring 63 to rotate through a proper angle. Assume the conductive ring 63 is in contact with two conductive pieces 64 so that different resistances are presented. Each time the zipper 61 is pulled, a different resistor is conducted so as to present different resistance (referring to FIGS. 3A, 3B, 3C and 3D). Therefore, the ceiling lamp 20 may present different brightness and the operation thereof is very simple.

When the user pulls the zipper switch 60 so as to conduct to a minimum resistor unit 50, then the capacitor 51 may conduct with a large current. When the voltage across the capacitor 51 achieves to a breakdown voltage of the trigger diode 80, the capacitor 51 may discharge through the bidirectional silicon control rectifier 70. When the bidirectional silicon control rectifier 70 is stimulated by the trigger diode 80 so as to retain a conduct condition continuously. Therefore, most current flows through the ceiling lamp 20 so that the ceiling lamp 20 presents a largest brightness.

When the zipper switch 60 is switched and conduct as the resistor unit 50 has a maximum value, the capacitor 51 is charged by a small current so that the time period for breakdown the trigger diode 80 is prolonged. Therefore, the time for stimulating the bidirectional silicon control rectifier 70 is postponed so that the conduction time of the current is reduced and the current of the ceiling lamp 20 is decreased. As a result, the brightness of the ceiling lamp 20 will reduce so that the user may adjust the brightness of the ceiling lamp step by step.

The control circuit 40 of the present invention may be a central processing unit, thereby, above effect being achieved.

The advantage of the present invention is:
1. The brightness of the ceiling lamp is adjustable step by step. Since the operation way and control way of the ceiling lamp are identical to the prior art. By pulling the zipper switch, the conductive ring may rotate at any angle, so that the conductive ring is conducted with resistor of different resistance, while the current is not affected by the resistor. The ceiling lamp may present different brightness. Thereby, the brightness of the ceiling lamp can be adjusted step by step.
2. The operation of the ceiling lamp is very easy. The user is only necessary to pull the zipper switch. Each time the zipper switch is pulled, the ceiling lamp presents a different brightness. The operation is very simple.

The present invention are thus described, it will be obvious that the same may be varied in many was. Such variations are not to be regarded as a departure from the spirit and scope of the present invention, and all such modifications as would be obvious to one skilled in the art are intended to be included within the scope of the following claims.

What is claimed is:

1. A ceiling lamp brightness control device having a control device, one end of the control device being connected to an AC current source, and another end thereof being connected to at least one ceiling lamp; the ceiling lamp brightness control device comprising:

a zipper switch having a zipper which drives a shaft to rotate; the shaft being enclosed by a conductive ring; a periphery of the conductive ring being installed with a plurality of conductive pieces spaced with an equal space; and the conductive ring being able to contact a selected conductive piece;

a power element for controlling the conduction of the AC current source so as to control a power to the ceiling lamp; and a control circuit connected to the zipper switch and the power element; the control circuit generating a specific clock waveform through the conduction by pulling the zipper switch, thereby, the power element being triggered to be conducted at a specific time.

2. The ceiling lamp brightness control device as claimed in claim 1, wherein the control circuit is a central processing unit: the central processing unit is controlled by the zipper switch so as to generate a specific time clock.

3. The ceiling lamp brightness control device as claimed in claim 1, wherein the control circuit includes a current formed by a capacitor, resistors and a trigger diode; the zipper switch controls the time constant of the discharge and charge of the circuit and then a specific time clock waveform is generated by triggering the diode.

4. The ceiling lamp brightness control device as claimed in claim 1, wherein the power wire element is a silicon control rectifier.

* * * * *